Aug. 9, 1960
L. G. ARPIN
2,948,369
ACCELERATOR CONTROL
Filed Oct. 2, 1958
2 Sheets-Sheet 2
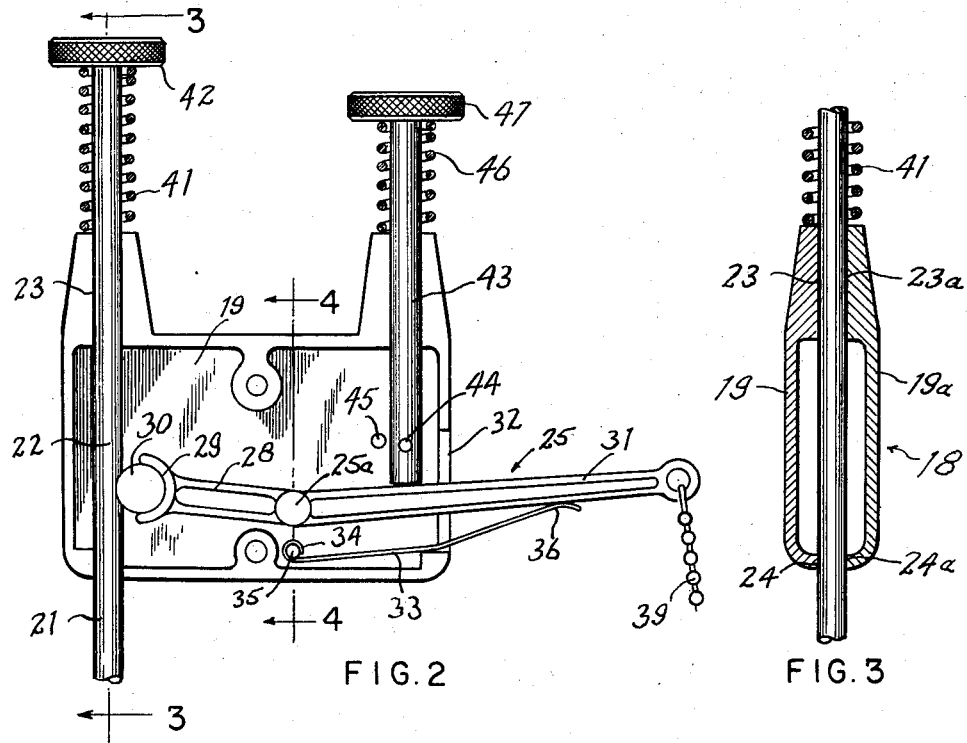
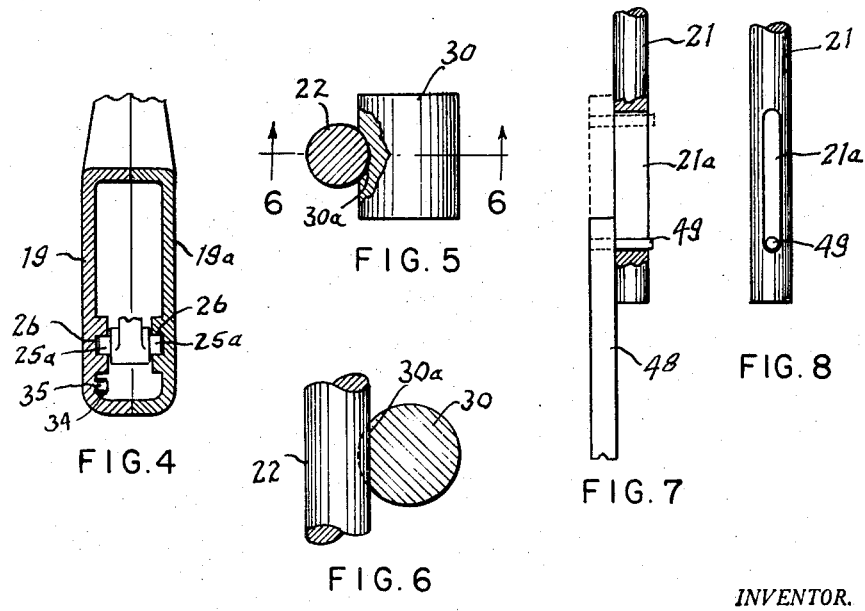
INVENTOR.
Leon G. Arpin
BY P. Stephen Baker
ATTORNEY

United States Patent Office 2,948,369
Patented Aug. 9, 1960

2,948,369

ACCELERATOR CONTROL

Leon G. Arpin, 340 Mountain Ave., North Caldwell, N.J.

Filed Oct. 2, 1958, Ser. No. 764,977

5 Claims. (Cl. 192—3)

This invention relates to an accelerator control for use in automotive vehicles.

It may be desirable during the operation of an automotive vehicle to operate the same at a fixed, predetermined speed, without the necessity of holding the foot on the accelerator pedal to maintain such fixed speed.

Accordingly, an object of this invention is to provide an improved accelerator control which comprises a minimum number of parts, is easy to operate and may be readily actuated to retain the carburetor throttle valve in a selected position corresponding to a desired speed, independently of the operation of the accelerator pedal, thereby allowing the foot to be removed from such pedal, while the desired speed is maintained.

A further object of this invention is to provide an improved accelerator control which may be quickly mounted on an automotive vehicle and readily connected to the carburetor, together with actuating means therefor, which may take the form of the brake pedal or other suitable operating means, the control being further adapted to be quickly shifted between operative and inoperative conditions.

The invention will be further understood from the following description and drawings in which:

Figure 2 is a side elevational view of the control with the casing open to show the interior thereof;

Figure 3 is a transverse sectional view taken along the line 3—3 in Figure 2;

Figure 4 is a transverse sectional view taken along the line 4—4 in Figure 2;

Figure 5 is a top plan view showing the lock in engaged position;

Figure 6 is a transverse sectional view taken on the line 6—6 in Figure 5;

Figure 7 is a side elevational view showing an alternative form of connecting means; and Figure 8 is a front view thereof.

Figure 1:
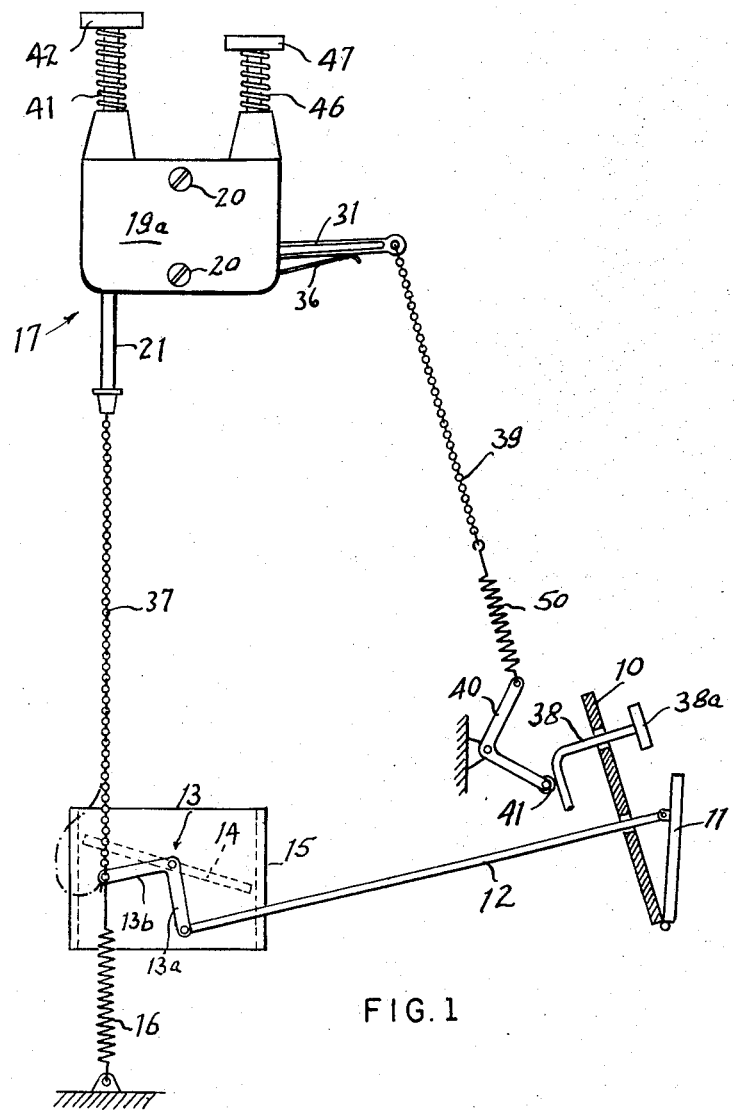
Figure 1 is a diagrammatic representation of the accelerator control embodying the invention, in association with an automotive carburetor and brake pedal.

As shown in Figure 1, 10 designates the floor board usually found in an automotive vehicle and on which is mounted the usual foot operated accelerator pedal 11, the pedal 11 being connected by a linkage 12 to one arm 13a of a bell crank lever 13 fixed to throttle valve 14 in carburetor 15. The other arm 13b of lever 13 is connected to a spring 16 which biases valve 14 to its idling position, all in a manner well known in the art.

The accelerator control embodying the invention is generally indicated at 17 and comprises a relatively small flat casing 18 made up of opposed, mating sections 19, 19a held together by screws 20. A control rod 21 is arranged to have an intermediate portion 22 thereof slidably mounted between casing sections 19, 19a which may be formed with semicylindrical, mating bearing portions 23, 23a and 24, 24a to receive said rod, bearing portions 24, 24a forming a projection from the upper edge of casing 18.

Means are provided for releasably locking control rod 21 against slidable movement relative to casing 18. To this end, a lever 25 is provided, said lever being formed with integral pivot portions 25a extending from opposite sides thereof, said pivot portions being receivable in opposed recesses 26, formed on the inner surfaces of casing sections 19, 19a.

Lever 25 comprises a short arm 28 extending toward rod portion 22 and terminating in an integral semicircular bearing portion 29 for loosely receiving therein a roller 30 which bears against rod 21. Lever 25 further comprises a long arm 31 angularly related to arm 28 and projecting outwardly of casing 18 through mating slots 32 in end wall portions of casing sections 19, 19a.

Lever 25 is biased in a direction to wedge roller 30 tightly into engagement with opposed surface portions of rod 21. To this end, a bent leaf spring 33 has a curled end 34 thereof removably mounted on a projection 35 on the inner surface of casing section 19, the projection being located beneath pivot recess 26. The spring 33 includes an upwardly bent outer end portion 36 which engages the underside of lever arm 31 adjacent the outer end thereof, thus urging lever 23 in a counterclockwise direction looking at Figure 2, and wedging rod 21 against sliding or shifting movement relative to the casing 18.

Roller 30 is formed on a circumferential portion thereof with an arcuate recess 30a having a radius equal to that of rod 21. Thus, the roller 30, freely movable in bearing portion 29 will be self-aligning with respect to rod 21, and undue wear of the opposed wedged surfaces will be avoided.

The accelerator control 17 is suitably mounted in relation to carburetor 15, the lower end of control rod 21 being connected to lever arm 13b by a flexible connection, which may take the form of a bead chain 37. The outer end of lever arm 31 is connected to means for actuating lever 25, which may take the form of brake lever 38 projecting through floor board 10 and operated by brake pedal 38a. The connecting means comprise a bead chain 39 connected at its lower end to one arm of a bell crank lever 40, the other arm of said lever having a roller 41 on the outer end thereof bearing against brake lever 38.

In operating the accelerator control 17, it is understood that the accelerator pedal 11 may be operated in the conventional manner to vary the fuel input to carburetor 15 by varying the pivoted position of throttle valve 14, the vehicle operator's foot being on pedal 11 at all times.

However, assuming that pedal 11 has been depressed to pivot throttle valve 14 to a position corresponding to a selected speed, and it is wished to maintain such speed, then control 17 is made operative by using the operator's other foot to lightly touch brake pedal 38a. This action, slightly depresses brake lever 38 and pulls chain 39 to actuate lever 25 so as to momentarily release control rod 21 by moving roller 30 out of its tightly wedged relation to the control rod 21.

The initial pivoted movement of the throttle valve 14 to the position corresponding to said selected speed produces a slack in chain 37, as long as rod 21 is in its fixed position, such slack being indicated in dotted lines in Figure 1. When rod 21 is released for movement by actuation of lever 25, as described above, chain 37 will become taut as rod 21 is moved upwardly relative to casing 17 by the action of a coil spring 41 which abuts a cap member 42 on the upper end of rod 21, and also abuts bearing portions 23, 23a.

However, as lever 25 is only momentarily moved to its release position, immediately thereafter rod 21 is relocked in its elevated position by the spring 33 which biases said lever to bring roller 30 into wedging relation with said control rod. Accordingly, the operator's foot may be removed from accelerator pedal 11, yet throttle valve 14 will be retained in its last position due to the locked rod 21 and resultant taut chain 37, which overcomes the biasing action of idler spring 16.

In the event that thereafter it is desired to restore the system to its conventional operating condition, wherein the speed of the vehicle is directly responsive to the foot operated accelerator pedal 11, then control 17 may again be actuated, merely by tapping brake pedal 38a. This results in a pull on chain 39 which momentarily releases rod 21 by moving roller 30 out of its wedging position relative to the rod. With rod 21 free to move, idler spring 16, which has a strength greater than spring 41, will become operative to bias throttle valve 14 toward its idling position, thereby pulling rod 21 downwardly to its original position. Throttle valve 14 is now fully responsive to the movement of accelerator pedal 11.

It is understood that each time lever 25 of control 17 is actuated, as by operating brake pedal 38a, the rod 21 is only momentarily released for slidable or shifting movement, as the lever 23 is immediately thereafter biased to its locking position by the action of spring 33. It is further understood that lever 25 may be connected to the brake pedal actuating means by means other than chain 39. Thus, brake 38 may operate a solenoid or pneumatic means for moving lever 25.

The control 17 may be locked out to leave the same in an inoperative condition, thereby permitting the brake pedal 38a to be operated in its normal manner without actuating the control. To this end, detent means comprising a manually operated rod 43 is slidably mounted in casing 18 in parallel relation to control rod 21, and being so located that its lower end is in opposed relation to lever arm 31 for depressed movement to move said lever arm. A short pin 44 projects laterally from a lower portion of rod 43 and is adapted to engage a shoulder latch 45 on casing portion 19, when rod 43 is depressed and turned 90° to the left looking at Figure 2, thus locking rod 43 in its depressed position whereby the lever arm 31 is depressed to disengage roller 30 from wedging relation with control rod 21.

A spring 46 on the outer end of rod 43, bearing against a cap 47 on the outer end of said rod, biases said rod to its raised position when the rod 43 is turned to the right to disengage pin 44 from shoulder 45 to restore control 17 to its operative condition. Thus, with rod 43 manually depressed by way of cap 47 lever 25 is retained in its release position and brake lever 38 may be operated as usual without actuating lever 25.

In lieu of chain 37, a rigid connection may be made between control rod 21 and crank arm 13b. Thus, as shown in Figures 7, 8, a rod 48 is pivoted at its lower end to crank arm 13b and is provided at its upper end with a laterally projecting pin 49. The control rod 21 is formed with a longitudinal slot 21a to slidably receive pin 49. Thus, movement of pedal 11, as previously described, to set valve 14 at a position corresponding to a selected speed, will raise rod 48 relative to rod 21 by a lost motion relation between members 21, 48, and release of lever 25, as previously described, will elevate rod 21 under the bias of spring 41 until pin 49 is located at the bottom of slot 21a, thus holding valve 14 in its predetermined position, as previously described.

A spring section 50 in chain 39 prevents breaking of the chain when brake pedal 38a is suddenly and quickly depressed more than is actually necessary to actuate lever 25. In such case, the spring section 50 will elongate and save chain 39 from snapping. The spring section 50 will not elongate under a slight movement of the brake pedal, thus keeping chain 39 taut under normal conditions, to actuate lever 25.

It will be apparent that with the control 17 of the instant invention, despite the setting of throttle valve 14 for a predetermined speed, said speed can be exceeded whenever desired, by depressing pedal 11. To further advance valve 14, the flexible chain 37 or member 48 permits such advance without disturbing the setting of locked rod 21. On release of pedal 11, the valve 14 will reassume its setting for said predetermined speed.

What is claimed is:

1. An automotive accelerator control in combination with a carburetor having a throttle valve member and idling spring means for normally moving said valve member to its idling position, said control comprising a shiftable member, control spring means for moving said shiftable member, connecting means directly connecting said valve member and said shiftable member, frictional sliding locking means engageable with said shiftable member for releasably locking said shiftable member in selected longitudinal positions thereof, said control spring means operating to actuate said shiftable member when said shiftable member is released, said connecting means having independent movement and thereby being operative to permit advanced and retracted movement of said valve member while said shiftable member is locked against movement, said connecting means being further operative to retain said valve member in a selected advanced position thereof when said shiftable member is released and free to move under the action of said control spring means to a position limited by said connecting member, said shiftable member being adapted to be held in a locked position while said valve member is advanced to a position corresponding to a predetermined speed, releasing means permitting momentary actuation of said locking means to release said shiftable member movement limited by said connecting means to a position corresponding to said predetermined speed and thereby retain said valve member in said advanced position, said releasing means being thereafter operable to again release said shiftable member for movement thereby leaving said idling spring means free to move said valve member to its idling position.

2. An accelerator control as in claim 1 wherein said connecting means comprises an elongated flexible element.

3. An accelerator control for an automotive carburetor having a throttle valve, said control comprising a casing, a shiftable member mounted on said casing and adapted to be connected to the throttle valve of the carburetor, spring means for moving said shiftable member in one direction, means on said casing for releasably locking said shiftable member in selected longitudinally spaced positions, said locking means comprising a lever pivotally mounted on said casing and including one arm extending toward said shiftable member and another arm extending away from said shiftable member, said one arm having mounted on the other end thereof means for engaging said shiftable member in wedging relation upon movement of said lever in one direction, spring means on said casing engageable with the other arm for biasing said lever in said one direction, and movable detent means on said casing engageable with said other arm for moving said lever in the other direction to release said shiftable member and coacting means on said casing and on said detent means for retaining said detent means in its operative position.

4. A control as in claim 3 wherein said detent means comprises an elongated member bearing means on said casing for slidably mounting said elongated member, the lower end of said elongated member abutting said other lever arm and adapted to be depressed to move said lever against the action of said second mentioned spring means and thereby disengage said wedging means from engagement with said shiftable member, said coacting means comprising a pin extending laterally from said elongated member and latch means on said casing for engagement by said pin upon combined depressed and rotary movement of said elongated member, and spring means for raising said elongated member to its inoperative position upon disengagement of said pin from said latch means.

5. The combination as in claim 2 wherein said idling spring means has a strength greater than that of said control spring means, whereby release of said shiftable member will leave said throttle valve member free to retract to its idling position under the action of said idling spring means.

References Cited in the file of this patent

UNITED STATES PATENTS

| | | |
|---|---|---|
| 2,014,300 | Strobridge | Sept. 10, 1935 |
| 2,034,253 | Shelley | Mar. 17, 1936 |
| 2,136,295 | Hansew | Nov. 8, 1938 |
| 2,143,318 | Isbell | Jan. 10, 1939 |
| 2,477,865 | Du Charme | Aug. 2, 1949 |